(12) United States Patent
Lin

(10) Patent No.: US 11,556,186 B1
(45) Date of Patent: Jan. 17, 2023

(54) BACKLIGHT CONTROL SYSTEM HAVING AT LEAST ONE MOVABLE LIGHT SHEET THAT INCLUDES AT LEAST ONE LIGHT-EMITTING UNIT

(71) Applicant: Primax Electronics Ltd., Taipei (TW)

(72) Inventor: Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/483,784

(22) Filed: Sep. 23, 2021

(30) Foreign Application Priority Data

Aug. 11, 2021 (TW) ................... 110129626

(51) Int. Cl.
*G06F 3/02* (2006.01)
*H05B 47/17* (2020.01)
*H01H 13/83* (2006.01)

(52) U.S. Cl.
CPC ............ *G06F 3/021* (2013.01); *H01H 13/83* (2013.01); *H05B 47/17* (2020.01)

(58) Field of Classification Search
None
See application file for complete search history.

(56) References Cited

U.S. PATENT DOCUMENTS

| | | | | |
|---|---|---|---|---|
| 2011/0043384 A1* | 2/2011 | Cheng | ................... | H01H 13/83 341/22 |
| 2012/0249344 A1* | 10/2012 | Chou | ................... | H01H 13/83 341/22 |
| 2014/0166456 A1* | 6/2014 | Chen | ................... | H01H 13/83 200/5 A |
| 2016/0284492 A1* | 9/2016 | Chen | ................... | H01H 3/125 |
| 2018/0082800 A1* | 3/2018 | Wang | ................... | H01H 13/10 |

FOREIGN PATENT DOCUMENTS

| | | | | |
|---|---|---|---|---|
| CN | 102375546 A | * | 3/2012 | |
| CN | 103177894 A | * | 6/2013 | |
| CN | 106340413 A | * | 1/2017 | ............. H01H 13/83 |

OTHER PUBLICATIONS

Plate Mounted VS PCB Mounted Switches, Apr. 21, 2021, pp. 5-13, https://web.archive.org/web/20210501000000*/https://switchandclick.com/plate-mounted-vs-pcb-mounted-keyboard (Year: 2021).*

* cited by examiner

*Primary Examiner* — Kirk W Hermann
(74) *Attorney, Agent, or Firm* — Kirton McConkie; Evan R. Witt

(57) ABSTRACT

A backlight control system includes a keyboard device and a computing device. The keyboard device includes a fixed light sheet, at least one movable light sheet, a light guide module and a key module. The computing device includes a processing unit. The movable light sheet is detachably and electrically connected with the fixed circuit board. The fixed light sheet projects a first light beam to plural keys of the key module through the light guide module. In a special scenario mode, the processing unit drives the movable light sheet to project a second light beam to at least one special key of the key module.

11 Claims, 7 Drawing Sheets

BACKLIGHT CONTROL SYSTEM HAVING AT LEAST ONE MOVABLE LIGHT SHEET THAT INCLUDES AT LEAST ONE LIGHT-EMITTING UNIT

FIELD OF THE INVENTION

The present invention relates to a light source control system, and more particularly to a backlight control system for an input device.

BACKGROUND OF THE INVENTION

In modern societies, electronic products become indispensable parts in human lives. The electronic products are applied in many sectors, including food, clothing, housing, transportation, education and entertainment. Generally, the consumer electronic product is equipped with a keyboard. In order to improve the practicality of the keyboard, a backlight module is usually installed in the keyboard. The backlight module can project light beams to the keys of the keyboard. Consequently, the user can operate the keyboard in a dim or dark environment. Moreover, the backlight module can be used to execute the prompt functions of the keyboard.

Nowadays, the backlight modules are usually classified into two types, i.e., an edge-type backlight module and a direct-type backlight module. The edge-type backlight module usually generates a single luminous visual effect. In addition, the edge-type backlight module is unable to illuminate a single key. That is, the edge-type backlight module is only able to illuminate or darken all keys simultaneously. When compared with the edge-type backlight module, the keyboard with the direct-type backlight module can generate various combined luminous visual effects for the keys. However, the keyboard with the direct-type backlight module is usually costly.

For overcoming the drawbacks of the conventional technologies, there is a need of providing a technology for allowing the keyboard with the edge-type backlight module to generate various luminous visual effects.

SUMMARY OF THE INVENTION

The present invention provides a backlight control system for an edge-type backlight module. The backlight control system is able to allow the keyboard device to generate various luminous visual effects. Consequently, the user can quickly recognize and use the special keys of the keyboard in different scenario modes.

In accordance with an aspect of the present invention, a backlight control system is provided. The backlight control system includes a keyboard device and a computing device. The keyboard device includes a fixed light sheet, at least one movable light sheet, a light guide module and a key module. The fixed light sheet includes a fixed circuit board and plural first light-emitting units. The plural first light-emitting units are installed on the fixed circuit board. Each of the at least one movable light sheet includes an extension circuit board and at least one second light-emitting unit. The at least one second light-emitting unit is installed on the extension circuit board. The extension circuit board is detachably and electrically connected with the fixed circuit board. The light guide module is located over the fixed light sheet and the at least one movable light sheet. The key module is located over the light guide module. The key module includes plural keys. The computing device includes a processing unit. The processing unit is electrically connected with the fixed circuit board. The processing unit controls the at least one movable light sheet through the fixed circuit board. The plural first light-emitting units project a first light beam to the plural keys through the light guide module. In a special scenario mode, the processing unit drives the at least one second light-emitting unit to project a second light beam to at least one special key of the plural keys.

In an embodiment, the special scenario mode includes a mode of enabling a numeric keyboard function, a mode of enabling a shortcut key function, a mode of enabling a Fn key function, a mode of enabling a Caps lock function, or a mode of enabling a Number lock function.

In an embodiment, the key module further includes a metallic structure, and the metallic structure is located under the plural keys. The metallic structure includes plural light-outputting openings, and the plural light-outputting openings are aligned with the corresponding keys.

In an embodiment, the light guide module includes a light guide plate, a reflective layer, a light-transmissible layer and plural reflective microstructures. The reflective layer is located under the light guide plate. The light-transmissible layer is located over the light guide plate. The plural reflective microstructures are arranged between the light guide plate and the reflective layer. The plural reflective microstructures are aligned with the corresponding light-outputting openings.

In an embodiment, the fixed light sheet is located at a lateral edge region of the light guide module, and the plural first light-emitting units project the first light beam to a lateral wall or a bottom side of the light guide plate. The first light beam is transferred within the light guide plate, reflected by the plural reflective microstructures, transmitted through the light-transmissible layer and the plural light-outputting openings, and projected to the plural keys.

In an embodiment, the light guide plate includes at least one perforation. The at least one perforation is aligned with the at least one special key. The at least one second light-emitting unit is installed in the at least one perforation.

In an embodiment, the at least one second light-emitting unit is in a top-view lighting mode, and the at least one second light-emitting unit projects the second light beam to the at least one special key.

In an embodiment, a light leakage prevention structure is formed on an inner wall of the at least one perforation.

In an embodiment, the at least one second light-emitting unit is in a side-view lighting mode, and the at least one second light-emitting unit projects the second light beam to an inner wall of the at least one perforation. The second light beam is transferred within the light guide plate, reflected by the reflective microstructures, transmitted through the light-transmissible layer and the plural light-outputting openings, and projected to the at least one special key.

In an embodiment, a light leakage prevention structure is formed on a first side of the inner wall of the at least one perforation. The at least one second light-emitting unit projects the second light beam to a second side of the perforation where the light leakage prevention structure is not formed.

In an embodiment, at least one light-inputting opening is formed in the reflective layer, and the at least one second light-emitting unit is inserted in the at least one light-inputting opening. The at least one second light-emitting unit is in a top-view lighting mode. The at least one second light-emitting unit projects the second light beam to a bottom side of the light guide plate. The second light beam is transferred within the light guide plate, reflected by the plural reflective microstructures, transmitted through the light-transmissible layer and the plural light-outputting openings, and projected to the at least one special key.

In an embodiment, the fixed circuit board includes a general-purpose input/output interface, and the processing unit is electrically connected with the general-purpose input/output interface. Consequently, the fixed light sheet and the at least one movable light sheet are controlled by the processing unit.

In an embodiment, the fixed circuit board includes at least one movable interface, and the extension circuit board is detachably connected with the at least one movable interface.

From the above descriptions, the backlight control system of the present invention is advantageous over the conventional technology. The backlight sources of the keyboard device include the fixed light sheet and the detachable movable light sheet. The detachable movable light sheet can be selected according to the demand of the manufacturer or the user. In this way, the product of the present invention is differentiated from similar products. Consequently, the recognizability and the uniqueness of the product are increased. Moreover, in the special scenario mode, the processing unit of the computing device drives the movable light sheet to project the second light beam to the special key through the fixed light sheet. Consequently, the special key can produce a different luminous visual effect, the user can quickly recognize and use different special keys in different scenario modes. Due to this structural design, the functionality of the keyboard device is increased, and the use experience of the user is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
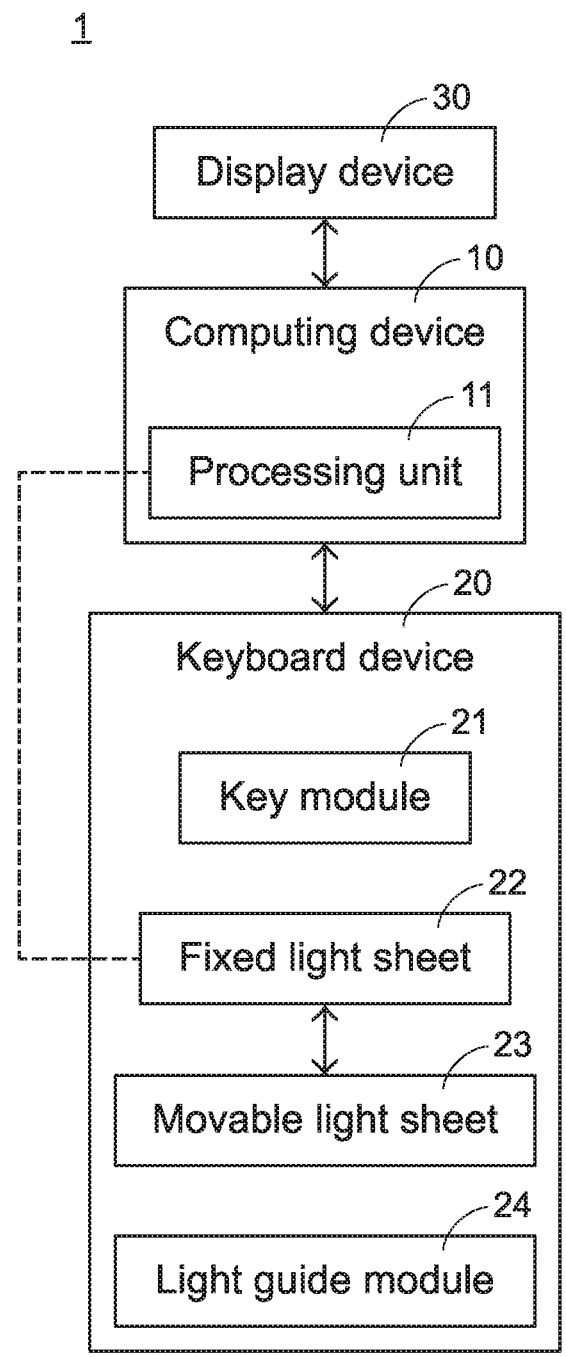
FIG. 1 is a schematic functional block diagram illustrating the architecture of a backlight control system according to an embodiment of the present invention.

Please refer to FIG. 1. FIG. 1 is a schematic functional block diagram illustrating the architecture of a backlight control system according to an embodiment of the present invention. The backlight control system 1 comprises a computing device 10, a keyboard device 20 and a display device 30. The computing device 10 comprises a processing unit 11. The keyboard device 20 comprises a key module 21, a fixed light sheet 22, at least one movable light sheet 23 and a light guide module 24. The fixed light sheet 22 is electrically connected with the movable light sheet 23. The processing unit 11 is electrically connected with the fixed light sheet 22. The fixed light sheet 22 projects a light beam with a tone to the key module 21 through the light guide module 24. Consequently, all keys of the key module 21 can generate a luminous visual effect. Moreover, in a special scenario mode, the processing unit 11 can drive the movable light sheet 23 through the fixed light sheet 22. Consequently, the movable light sheet 23 projects a light beam with another tone to a special key of the key module 21, and the special key generates a different luminous visual effect. For example, the special scenario mode includes a mode of enabling a numeric keyboard function, a mode of enabling a shortcut key function, a mode of enabling a Fn key function, a mode of enabling a Caps lock function, or a mode of enabling a Number lock function. The image controlled by the computing device 10 can be displayed on the display device 30.

Figure 2A:
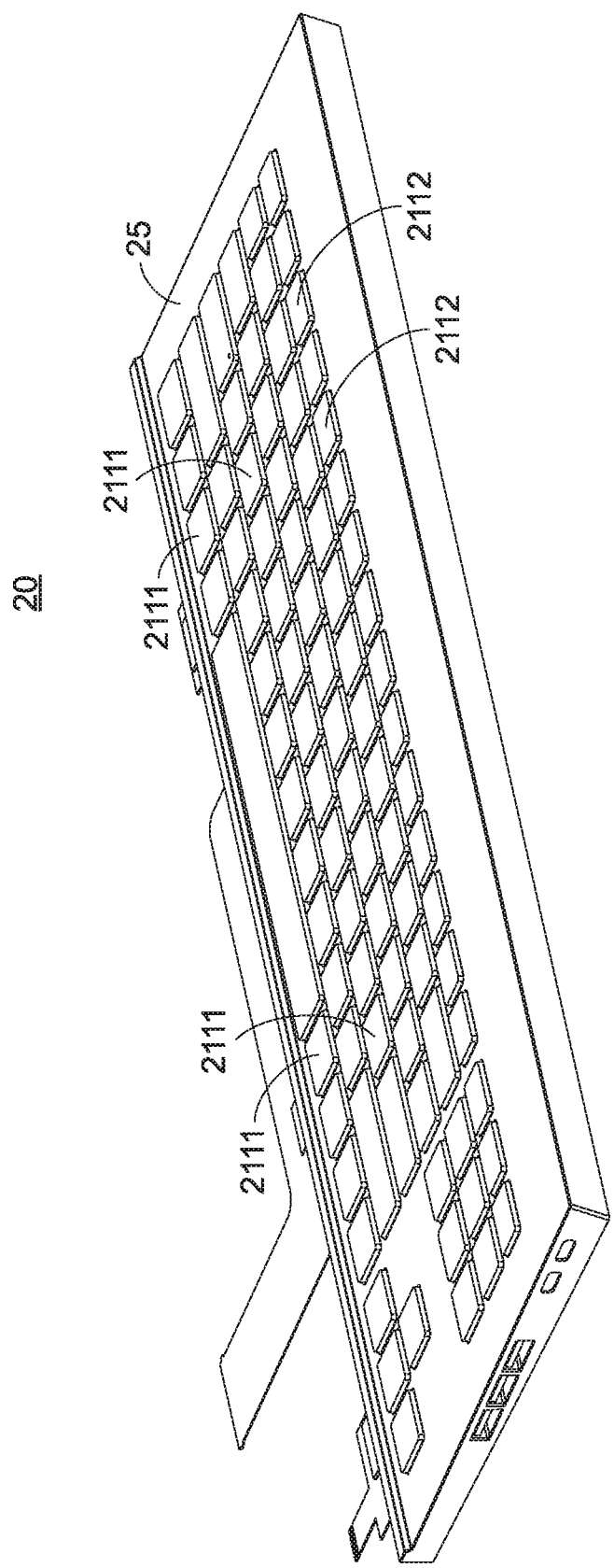
FIG. 2A is a schematic perspective view illustrating the keyboard device of the backlight control system according to the embodiment of the present invention.
Figure 2B:
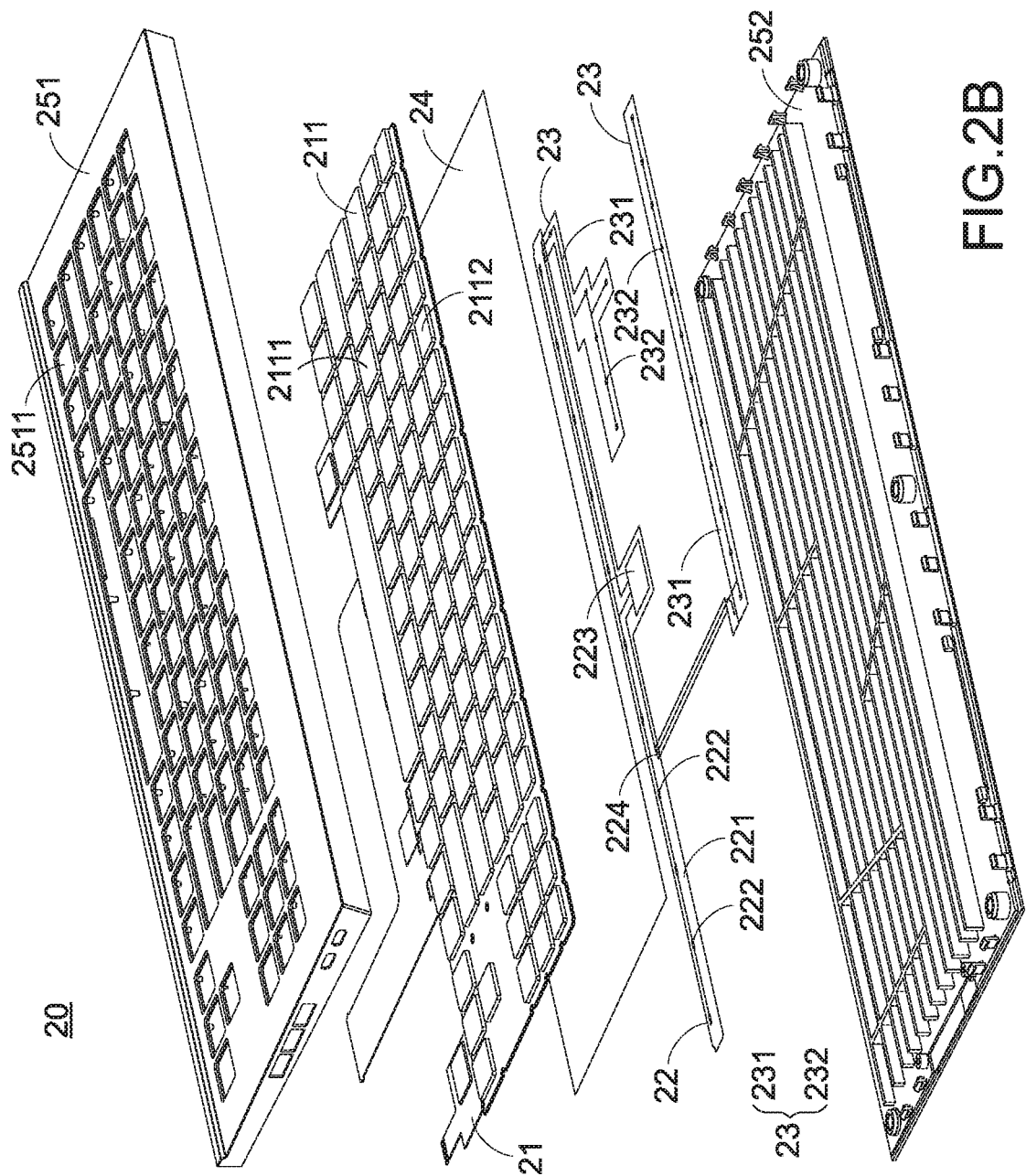
FIG. 2B is a schematic exploded view illustrating the keyboard device of the backlight control system according to the embodiment of the present invention.

Please refer to FIGS. 2A and 2B. FIG. 2A is a schematic perspective view illustrating the keyboard device of the backlight control system according to the embodiment of the present invention. FIG. 2B is a schematic exploded view illustrating the keyboard device of the backlight control system according to the embodiment of the present invention. In an embodiment, the keyboard device 20 comprises the key module 21, the fixed light sheet 22, the movable light sheet 23, the light guide module 24 and a casing 25.

The fixed light sheet 22 comprises a fixed circuit board 221, plural first light-emitting units 222, a general-purpose input/output (GPIO) interface 223 and a movable interface 224. The plural first light-emitting units 222 are installed on the fixed circuit board 221.

The movable light sheet 23 comprises an extension circuit board 231 and at least one second light-emitting unit 232. The at least one second light-emitting unit 232 is installed on the extension circuit board 231. The extension circuit board 231 is detachably connected with the movable interface 224, and thus the extension circuit board 231 is electrically connected with the fixed circuit board 221. In this embodiment, the extension circuit board 231 is electrically connected with the fixed circuit board 221 through the movable interface 224. In another embodiment, the circuitry of the extension circuit board 231 and the circuitry of the fixed circuit board 221 are connected with each other in a welding manner. It is noted that the method of connecting the circuitry of the extension circuit board 231 and the circuitry of the fixed circuit board 221 is not restricted.

For example, each of the fixed circuit board 221 and the extension circuit board 231 is a flexible printed circuit board (FPC), a rigid circuit board (RPC), or a combination thereof. The first light-emitting unit 222 and the second light-emitting unit 232 are light emitting diode (LED) dies, organic light emitting diode (OLED) dies or electroluminescence (EL) dies. In this embodiment, the keyboard device 20 is equipped with one fixed light sheet 22 and two detachable movable light sheets 23.

The processing unit 11 (as shown in FIG. 1) is electrically connected with the general-purpose input/output (GPIO) interface 223, which is installed on the fixed circuit board 221. In this way, the processing unit 11 can control the fixed light sheet 22, and the processing unit 11 can control the movable light sheet 23 through the fixed circuit board 221.

The light guide module 24 is located over the fixed light sheet 22 and the movable light sheet 23.

The key module 21 is located over the light guide module 24. In addition, the key module 21 comprises plural keys 211. The plural keys 211 include ordinary keys 2111 and at least one special key 2112.

The key module 21, the fixed light sheet 22, the movable light sheet 23 and the light guide module 24 are accommodated within the casing 25. The casing 25 comprises an upper cover 251 and a lower cover 252, which are combined together. The upper cover 251 comprises plural key openings 2511 at the positions corresponding to the plural keys 211. After the casing 25 is assembled, the plural keys 211 are exposed or partially penetrated through the corresponding key opening 2511 of the upper cover 251. Consequently, the keys 211 can be pressed by the user.

Figure 3:
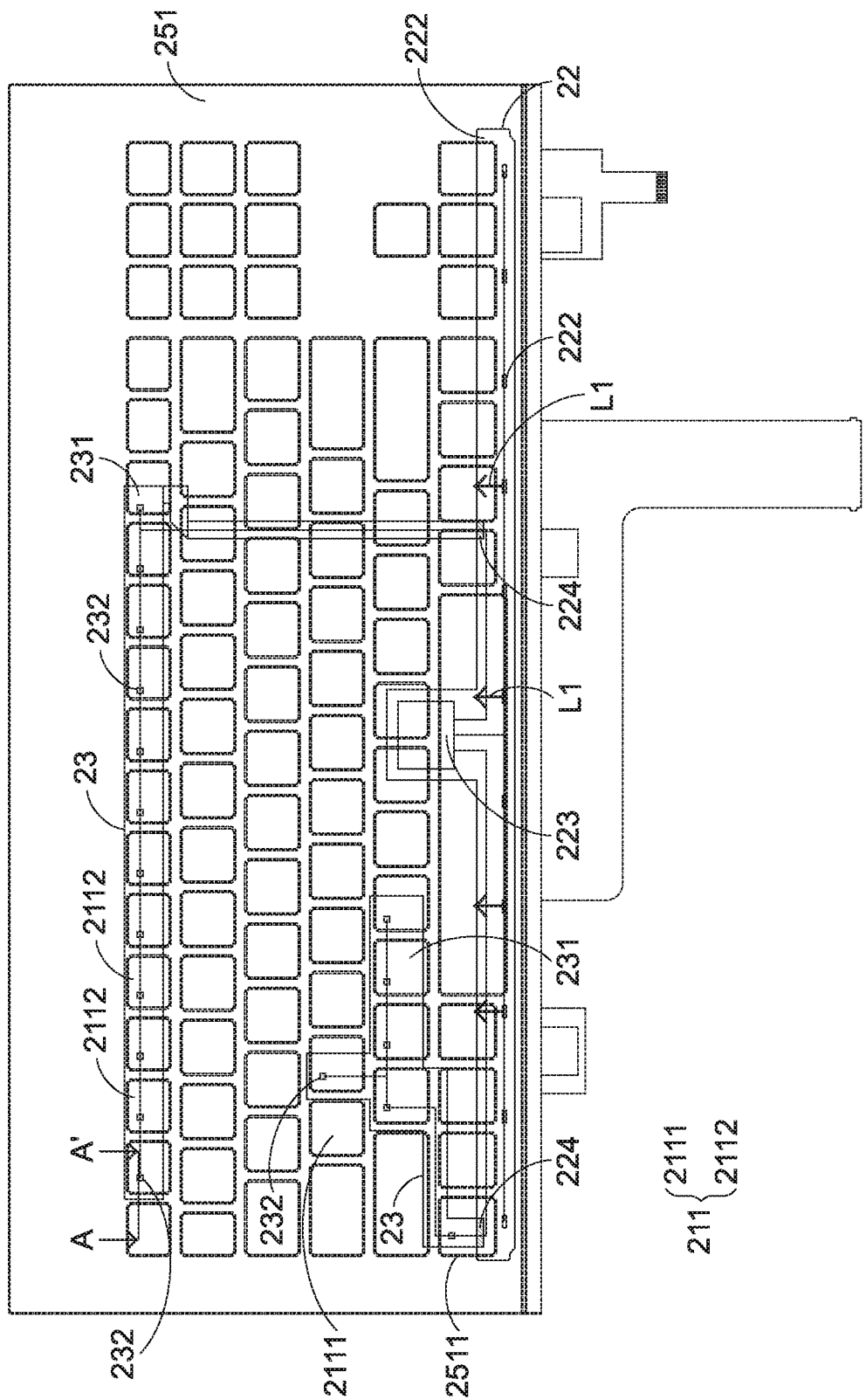
FIG. 3 is a schematic top view illustrating the keyboard device of the backlight control system according to the embodiment of the present invention.
Figure 4A:
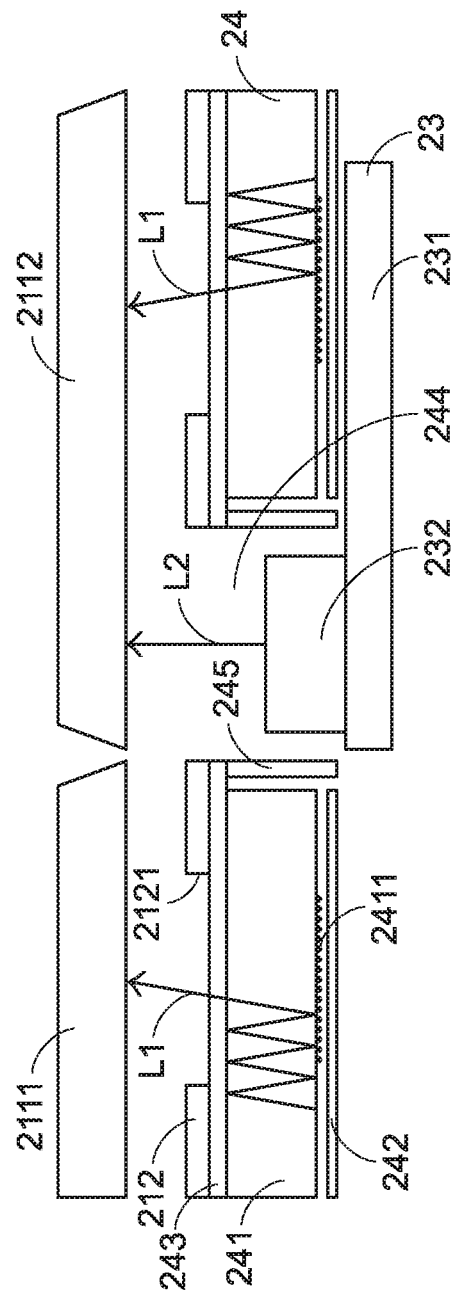
FIG. 4A is a schematic cross-sectional view illustrating a first exemplary structure of the keyboard device as shown in FIG. 3 and taken along the line A-A'.

Please refer to FIGS. 3 and 4A. FIG. 3 is a schematic top view illustrating the keyboard device of the backlight control system according to the embodiment of the present invention. FIG. 4A is a schematic cross-sectional view illustrating a first exemplary structure of the keyboard device as shown in FIG. 3 and taken along the line A-A'. For succinctness, the supporting structure of the key module 21 is not shown. As shown in FIG. 3, the fixed light sheet 22 is located at a first lateral edge region of the light guide module 24. One of the two movable light sheets 23 is extended toward a middle region of the light guide module 24. The other movable light sheet 23 is extended along a second lateral edge region of the light guide module 24. The second lateral edge region is opposed to the first lateral edge region wherein the fixed light sheet 22 is located. As shown in FIG. 4A, the special key 2112 is a shortcut key. For example, when the special key 2112 is triggered, the function of opening a mail, opening homepage, turning on/off a computer, adjusting sound volume or enabling a calculator is implemented. A metallic structure 212 is located under the special key 2112. The metallic structure 212 comprises plural light-outputting openings 2121 for limiting the light-outputting positions. The plural light-outputting openings 2121 are aligned with the corresponding keys 211.

The light guide module 24 comprises a light guide plate 241, a reflective layer 242 and a light-transmissible layer 243. The reflective layer 242 is located under the light guide plate 241. The light-transmissible layer 243 is located over the light guide plate 241. In addition, plural reflective microstructures 2411 are arranged between the light guide plate 241 and the reflective layer 242. The reflective microstructures 2411 are aligned with the corresponding light-outputting openings 2121 of the metallic structure 212. In this embodiment, the reflective microstructures 2411 are formed on a bottom surface of the light guide plate 241. In addition, the light guide plate 241 has at least one perforation 244. The at least one perforation 244 is aligned with the at least one special key 2112. In this embodiment, the second light-emitting unit 232 is in a top-view lighting mode, and a light leakage prevention structure 245 is formed on an inner wall of the at least one perforation 244.

Please refer to FIGS. 3 and 4A again. When the keyboard device 20 is in an ordinary usage state, the first light-emitting unit 222 of the fixed light sheet 22 emits a first light beam L1 to the lateral wall or the bottom side of the light guide plate 241. The first light beam L1 is transferred within the light guide plate 241, reflected by the reflective microstructures 2411, transmitted through the light-transmissible layer 243 and the light-outputting openings 2121, and projected to all keys 211. When the keyboard device 20 is switched to a special scenario mode (e.g., the scenario mode of enabling a shortcut key function) by the user, the processing device 11 drives the movable light sheet 23 through the fixed light sheet 22. Consequently, the second light-emitting unit 232 projects a second light beam L2 upwardly to the special key 2112, wherein the tone of the second light beam L2 is different from the tone of the first light beam L1. The luminous visual effect generated by the special key 2112 is different from the luminous visual effect generated by the ordinary key 2111. Due to the luminous visual effect generated by the special key 2112, the user can recognize the special key 2112 (e.g., the position of the shortcut key) instantly and operate the special key 2112 quickly and conveniently.

In this exemplary structure, the light leakage prevention structure 245 is formed on the inner wall of the perforation 244. However, the light leakage prevention structure 245 may be omitted according to the practical requirements.

Figure 4B:
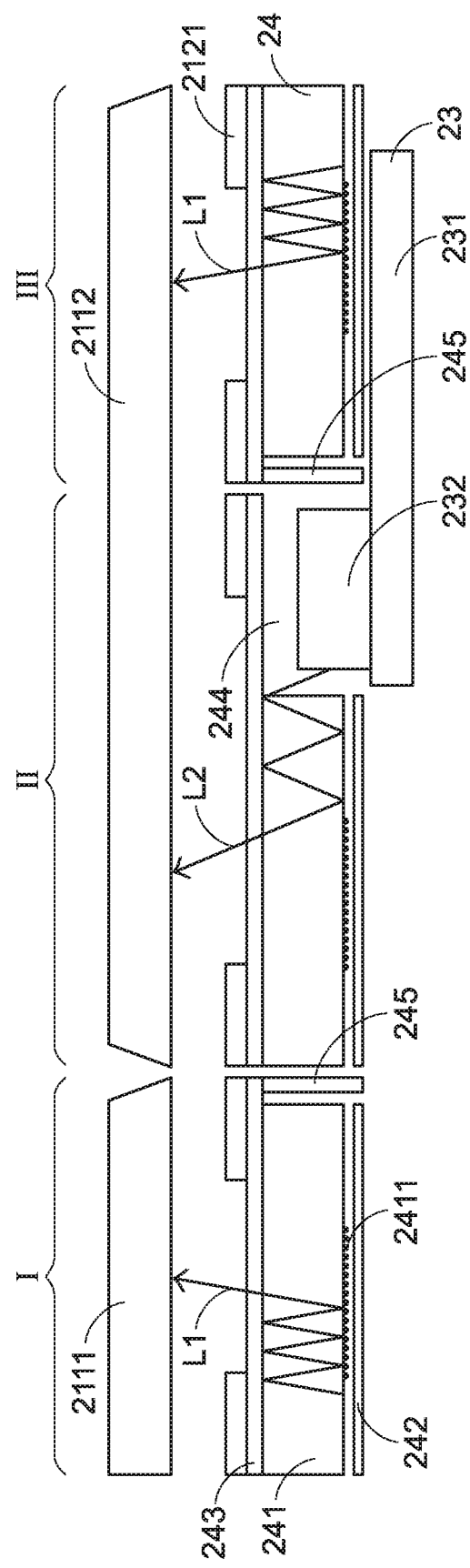
FIG. 4B is a schematic cross-sectional view illustrating a second exemplary structure of the keyboard device as shown in FIG. 3 and taken along the line A-A'.

Please refer to FIGS. 3 and 4B. FIG. 4B is a schematic cross-sectional view illustrating a second exemplary structure of the keyboard device as shown in FIG. 3 and taken along the line A-A'. The functions and operations of the components of the second exemplary structure are similar to those of the first exemplary structure, and not redundantly described herein. In comparison with the first exemplary structure, the light guide plate 241 of this embodiment is divided into three zones I, II and III by the light leakage prevention structure 245. The perforation 244 is located at the zone II of the light guide plate 241, and a portion of the light leakage prevention structure 245 is formed on a side of the inner wall of the perforation 244. In this embodiment, the second light-emitting unit 232 is in a side-view lighting mode. In a special scenario mode, the second light-emitting unit 232 projects the second light beam L2 to the side of the perforation 244 where no light leakage prevention structure 245 is formed. The second light beam L2 is transferred within the zone II of the light guide plate 241. Then, the second light beam L2 is reflected by the reflective microstructures 2411, transmitted through the light-transmissible layer 243 and the corresponding light-outputting opening 2121, and projected to the corresponding special key 2112. Consequently, the special key 2112 generates the luminous visual effect that is different from the luminous visual effect generated by the ordinary key 2111. In this exemplary structure, the light leakage prevention structure 245 is formed on a side of the inner wall of the perforation 244. However, the light leakage prevention structure 245 may be omitted according to the practical requirements.

Figure 4C:
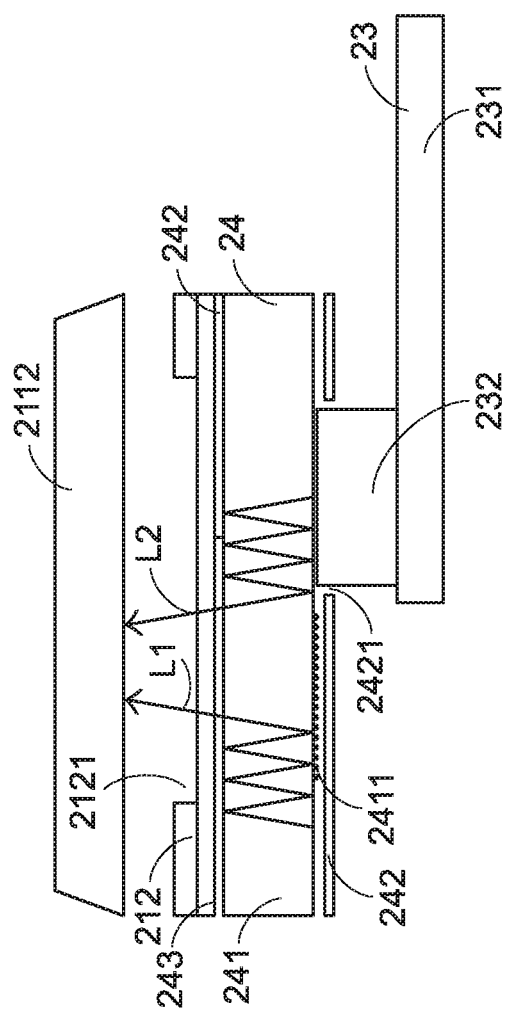
FIG. 4C is a schematic cross-sectional view illustrating a third exemplary structure of the keyboard device as shown in FIG. 3 and taken along the line A-A'.

Please refer to FIGS. 3 and 4C. FIG. 4C is a schematic cross-sectional view illustrating a third exemplary structure of the keyboard device as shown in FIG. 3 and taken along the line A-A'. The functions and operations of the components of the third exemplary structure are similar to those of the first exemplary structure, and not redundantly described herein. In comparison with the first embodiment, the light guide plate 241 is not equipped with the perforation 244 and the light leakage prevention structure 245. Moreover, a light-inputting opening 2421 is formed in the reflective layer 242. The second light-emitting unit 232 is installed in the light-inputting opening 2421. The second light-emitting unit 232 is in a top-view lighting mode. In addition, the second light-emitting unit 232 projects the second light beam L2 to the bottom side of the light guide plate 241. After the second light beam L2 is introduced into the light guide 241, the second light beam L2 is transferred within the light guide plate 241, reflected by the reflective microstructures 2411, transmitted through the light-transmissible layer 243 and the corresponding light-outputting opening 2121, and projected to the special key 2112. Consequently, the special key 2112 generates the luminous visual effect that is different from the luminous visual effect generated by the ordinary key 2111.

From the above descriptions, the backlight control system of the present invention is advantageous over the conventional technology. The keyboard device of the backlight control system of the present invention comprises the fixed light sheet and the detachable movable light sheet. The detachable movable light sheet can be selected according to the demand of the manufacturer or the user. In this way, the product of the present invention is differentiated from similar products. Consequently, the recognizability and the uniqueness of the product are increased. Moreover, in the special scenario mode, the processing unit of the computing device drives the movable light sheet to project the second light beam to the special key through the fixed light sheet. Consequently, the user can quickly recognize and use the special key in different scenario modes. Due to this structural design, the functionality of the keyboard device is increased, and the use experience of the user is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A backlight control system, comprising:
    a keyboard device comprising:
        a fixed light sheet comprising a fixed circuit board and plural first light-emitting units, wherein the plural first light-emitting units are installed on the fixed circuit board;
        at least one movable light sheet, wherein each of the at least one movable light sheet comprises an extension circuit board and at least one second light-emitting unit, wherein the at least one second light-emitting unit is installed on the extension circuit board, and the extension circuit board is detachably and electrically connected with the fixed circuit board;
        a light guide module located over the fixed light sheet and the at least one movable light sheet, wherein the light guide module comprises a light guide plate, a reflective layer, a light-transmissible layer and plural reflective microstructures, wherein the reflective layer is located under the light guide plate, the light-transmissible layer is located over the light guide plate, and the plural reflective microstructures are arranged between the light guide plate and the reflective layer; and
        a key module located over the light guide module, wherein the key module comprises plural keys and a metallic structure located under the plural keys, wherein the metallic structure comprises plural light-outputting openings, and the plural light-outputting openings are aligned with corresponding keys, wherein the plural reflective microstructures are aligned with corresponding light-outputting openings; and
    a computing device comprising a processing unit, wherein the processing unit is electrically connected with the fixed circuit board, and the processing unit controls the at least one movable light sheet through the fixed circuit board,
    wherein the plural first light-emitting units project a first light beam to the plural keys through the light guide module, wherein in a special scenario mode, the processing unit drives the at least one second light-emitting unit to project a second light beam to at least one special key of the plural keys.

2. The backlight control system according to claim 1, wherein the special scenario mode includes a mode of enabling a numeric keyboard function, a mode of enabling a shortcut key function, a mode of enabling a Fn key function, a mode of enabling a Caps lock function, or a mode of enabling a Number lock function.

3. The backlight control system according to claim 1, wherein the fixed light sheet is located at a lateral edge region of the light guide module, and the plural first light-emitting units project the first light beam to a lateral wall or a bottom side of the light guide plate, wherein the first light beam is transferred within the light guide plate, reflected by the plural reflective microstructures, transmitted through the light-transmissible layer and the plural light-outputting openings, and projected to the plural keys.

4. The backlight control system according to claim 1 wherein the light guide plate comprises at least one perforation, wherein the at least one perforation is aligned with the at least one special key, and the at least one second light-emitting unit is installed in the at least one perforation.

5. The backlight control system according to claim 4, wherein the at least one second light-emitting unit is in a top-view lighting mode, and the at least one second light-emitting unit projects the second light beam to the at least one special key.

6. The backlight control system according to claim 5, wherein a light leakage prevention structure is formed on an inner wall of the at least one perforation.

7. The backlight control system according to claim 4, wherein the at least one second light-emitting unit is in a side-view lighting mode, and the at least one second light-emitting unit projects the second light beam to an inner wall of the at least one perforation, wherein the second light beam is transferred within the light guide plate, reflected by the reflective microstructures, transmitted through the light-transmissible layer and the plural light-outputting openings, and projected to the at least one special key.

8. The backlight control system according to claim 7, wherein a light leakage prevention structure is formed on a first side of the inner wall of the at least one perforation, wherein the at least one second light-emitting unit projects the second light beam to a second side of the perforation where the light leakage prevention structure is not formed.

9. The backlight control system according to claim 1, wherein at least one light-inputting opening is formed in the reflective layer, and the at least one second light-emitting unit is inserted in the at least one light-inputting opening, wherein the at least one second light-emitting unit is in a top-view lighting mode, and the at least one second light-emitting unit projects the second light beam to a bottom side of the light guide plate, wherein the second light beam is transferred within the light guide plate, reflected by the plural reflective microstructures, transmitted through the light-transmissible layer and the plural light-outputting openings, and projected to the at least one special key.

10. The backlight control system according to claim 1, wherein the fixed circuit board comprises a general-purpose input/output interface, and the processing unit is electrically connected with the general-purpose input/output interface, so that the fixed light sheet and the at least one movable light sheet are controlled by the processing unit.

11. The backlight control system according to claim 1, wherein the fixed circuit board comprises at least one movable interface, and the extension circuit board is detachably connected with the at least one movable interface.

* * * * *